Oct. 11, 1960 D. B. JAMES 2,956,180

PULSE SHIFT MONITORING CIRCUIT

Filed June 26, 1958

INVENTOR
D. B. JAMES

BY

A. C. Winter
ATTORNEY 2,956,180

PULSE SHIFT MONITORING CIRCUIT

Dennis B. James, Murray Hill, N.J., assignor to Bell Telephone Laboratories, Incorporated, New York, N.Y., a corporation of New York Filed June 26, 1958, Ser. No. 744,735

12 Claims. (Cl. 307—88.5)

Figure 1:
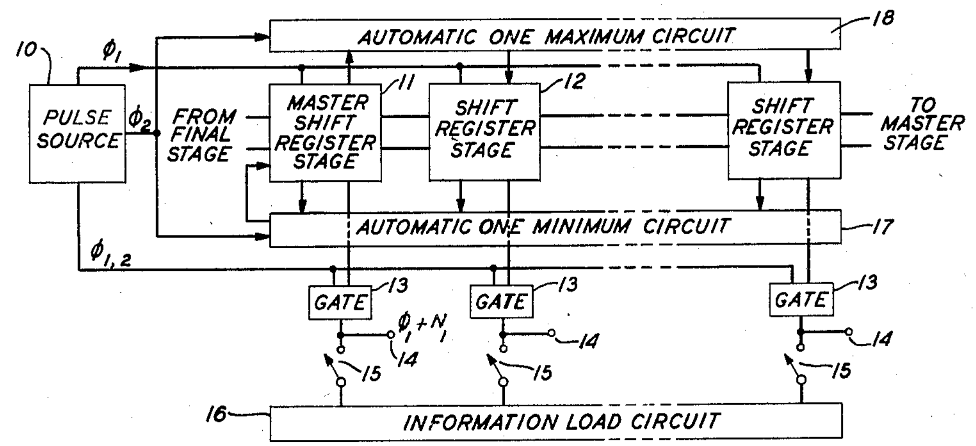

This invention relates to signal indicating apparatus and more particularly to circuitry which assures the presence of a desired stable state in a single stage of a triggered multivibrator shift register at any given time.

Ring counters, or closed loop shift registers, are widely employed in current electronic systems to perform various counting, timing, and code generating functions. One desired operation of such devices contemplates the continuous circulation of a single signal impulse through a closed chain of register stages which may comprise a series of interconnected bistable multivibrator circuits, also termed "flip-flops" or "trigger" circuits. These circuits usually consist of two symmetrically interconnected electronic devices such as transistors which are activated by an applied signal pulse to reverse their respective conditions of conductivity.

When such circuits are cascaded, and a control pulse from an external signal generator is applied simultaneously to each stage, output signals derived from each stage in turn can be made to represent multiples of the input signal frequency or may have binary significance. These functions necessitate the circulation through consecutive stages of one signal which produces the desired output indication of each stage. Thus, considering that the output signal is provided by a stage in the active state; i.e., one displaying a particular stable state, proper operation requires that at any given time only one of the cascaded stages be in the active state. The active state then must be transferred through successive stages of the closed shift register in response to applied advance pulses. Advantageously the desired stable state which provides an output indication is the same in each stage. In this manner output indications may be received from the same side of each stage in the active state.

Ideally, a single stage of the register is in the active state when the advance pulse is first applied to each stage, and the advance pulse inputs and interconnection of stages serve to maintain all but one stage inactive, the single active state being shifted continuously through successive stages. However, noise and deterioration of margins in the register circuitry, among other factors, may result in more or less than one stage exhibiting the active state at any given time. It is evident that such conditions are detrimental to optimum circuit operation, and that if present, they must be corrected with dispatch to preserve the desired operation.

It is a general object of this invention to improve shift register operation.

It is another object of this invention to assure continuous circulation of the active state through successive stages of a shift register.

It is a further object of this invention to automatically correct for the absence of the active state from all stages of the shift register.

It is still another object of this invention to automatically eliminate all but one active state in the shift register.

It is yet another object of this invention to make corrections in register activity rapidly and at times when output indications will not be affected.

These objects are attained, in accordance with the invention, by a combination of circuitry with each stage of the shift register and the advance pulse source, which circuitry continuously monitors the activity in each stage.

A momentary interruption in the functioning of a triggered multivibrator operates to change the stable state existing therein immediately after the functional interruption has passed. In accordance with the invention, one stage of the shift register is selected as the master stage and is set to display the stable state indicative of an active stage under prescribed operating conditions while all other stages are set to display the opposite stable state.

The monitoring circuits are connected to each stage of the register and continuously determine the stable state therein. Such connections may be made to either side of the bistable circuit so long as uniformity among stages is observed and proper consideration given to the effect of various signals received from or transmitted to each stage as will be seen hereinafter. In addition signals are applied to the monitoring circuitry intermediate the application of advance pulses to the shift register. If none of the stages are in the active state between advance pulse applications, the monitoring circuits respond to activate the master stage prior to receipt by the register of the next advance pulse. Also the presence of the active state in the master stage between advance pulses primes the monitoring circuitry to inactivate all other stages. In this fashion the monitoring circuits assure that the advance pulse will encounter at least one stage of the register in the active state and that, in beginning each cycle of register operation, no more than one stage of the register is in the active state.

It is a feature of this invention that a plurality of monitoring circuits operate in response to a signal transmitted intermediate shift register advance pulses to assure a desired stable state in a preselected stage of the shift register and the absence of such a desired stable state in all other stages of the shift register.

It is a more particular feature of this invention that a first plurality of register stage activity monitoring circuits operate in response to a signal from each one of the register stages in a first stable state in conjunction with a signal pulse intermediate advance pulses to set a preselected stage in a second stable state.

It is another more particular feature of this invention that a second plurality of register stage activity monitoring circuits operate in response to the presence of a signal from a preselected stage in the second stable state in conjunction with a signal pulse intermediate advance pulses to set all other stages in the first stable state.

Figure 2:
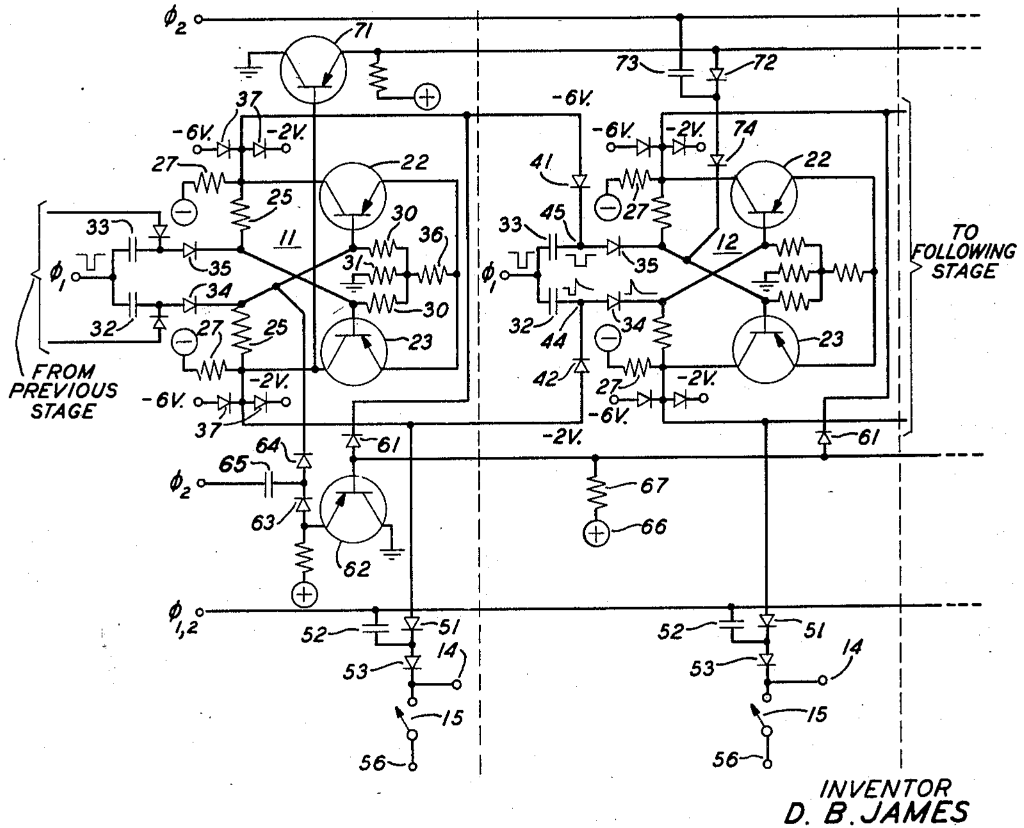

A complete understanding of this invention and of the various features thereof may be gained from consideration of the following detailed description and the accompanying drawing, in which:

Fig. 1 is a block diagram of a closed loop shift register and associated circuitry in accordance with the invention; and Fig. 2 is a schematic representation of two of the shift register stages shown in Fig. 1 and associated circuitry.

Turning now to the drawing, a shift register employing control circuitry in conjunction with each stage is depicted in Fig. 1 and comprises a pulse source 10 having pulses in one phase designated $\varphi_1$ applied simultaneously to a plurality of shift register stages such as 11 and 12. These applied pulses tend to change the stable state present in each stage, and in conjunction with interstage signal shifting, advance information through the successive stages at a frequency properly related to the frequency of application of the applied pulses from source 10.

The outputs of the shift register stages, advantageously taken from the same side of each stage, are applied as the parallel inputs to output gate circuits 13. The pulse source 10 applies pulses in selected phases such as $\varphi_1$ and $\varphi_2$ simultaneously to each of these gate circuits enabling them to provide a variety of output indications such as signals in various phases at pulse terminals 14 or binary coded information at a load 16 through selectively operated switches 15.

The designated operations require the consecutive advancement through the shift register stages of the active state, thus assuring the desired sequential appearance of a single register output signal at gates 13. The monitoring circuits 17 and 18, designated Automatic One Minimum and Automatic One Maximum, respectively, have connections to each stage of the shift register and operate in conjunction with $\varphi_2$ pulses from pulse source 10 to assure the presence of the active state in a single register stage at any given time.

Fig. 2 of the drawing illustrates in schematic form two stages 11 and 12 of the triggered multivibrator shift register together with the associated control circuitry in accordance with my invention. The particular triggered multivibrator circuit shown in Fig. 2 is of the "Eccles-Jordan" type utilizing solid state elements, although various multivibrator forms and component elements may be employed. As indicated in stage 11 the multivibrator comprises a pair of transistors 22 and 23 with cross-connected base-collector paths, as by the resistors 25, to form the bistable multivibrator or flip-flop circuit, as is known in the art. The collectors are connected, through individual resistors 27, to sources of negative potential, the bases through individual resistors 30 and common resistor 31 to ground, and the emitters through resistors 36 and 31 to ground.

Negative trigger pulses in phase $\varphi_1$ are applied to each stage from the pulse source 10 through capacitors 32 and 33 and diodes 34 and 35 to the bases of the transistors 22 and 23. The activating signals for the succeeding register stages are taken from the collectors of transistors 22 and 23 between clamping diodes 37. The activating signals from transistors 23 and also applied to the output circuitry in this example.

A brief review of the basic shift register operation employing the transistorized multivibrator circuits, as shown in Fig. 2, will be of assistance. Prior to application of the shift pulses designated $\varphi_1$, the transistors of each register stage are in opposite stable states. Thus, assume transistors 22 and 23 of stage 11 are respectively conducting and quiescent. A positive pulse applied to the base of transistor 22 in stage 11 will reduce conduction therethrough and make its collector voltage more negative. This negative collector voltage swing is transmitted through one resistor 25 to the base of transistor 23 causing it to conduct. Such conduction swings the collector voltage of transistor 23 more positive, which effect, in turn, is transmitted to the base of transistor 22 through the other resistor 25 and speeds it to cut-off. The process continues until transistor 22 is cut off and transistor 23 is fully conducting.

Clamping diodes 37 establish maximum and minimum signal voltage levels taken from the collectors of transistors 22 and 23 and available at diodes 41 and 42 respectively, as well as at the output diodes 51. Thus in the specific example indicated in Fig. 2, stage 11 transistor 22 in the quiescent state produces a negative 6 volt level at the anode of diode 41 coupled to stage 12. Similarly, conducting transistor 23 in stage 11 produces a negative 2 volt level at the anode of diode 42 coupled to stage 12.

A negative advance pulse $\varphi_1$, 6 volts in this example, is applied to the condensers 32 and 33 in each stage and thus will encounter the diodes 41 and 42 of stage 12 biased as described. The anodes of diodes 34 and 35 in stage 12 are slightly below ground potential at this time. Under these conditions the voltage at point 44 at the junction of capacitor 32 and diodes 34 and 42 will follow the negative going clock pulse until diode 42 conducts. The signal stored thereafter in the capacitor 32 discharges through diode 34 on the positive going edge of the shift pulse and provides a positive signal to the base of transistor 22 in stage 12. The 6 volt bias on diode 41 at this time maintains it nonconductive during the entire negative swing of the shift pulse. Under these circumstances no positive signal is available for transmission through diode 35 to transistor 23 in stage 12 on the positive going edge of the shift pulse. The wave shapes for the various pulses under the described conditions are shown in Fig. 2.

Thus a positive signal is steered to the base of transistor 22 in stage 12 due to the conducting transistor 23 in stage 11. Since transistor 22 in stage 12 was priorly quiescent, this positive signal will not alter the stable state which this stage exhibited prior to application of the shift pulse. However, had transistors 22 and 23 of stage 12 been conducting and quiescent, respectively, prior to application of the advance pulse, it is evident that a reversal of state would occur upon receipt of the advance pulse. Thus the condition of the transistors in one stage is shifted to the succeeding stage with each advance pulse, and information represented by a particular stable state is continuously circulated in the closed register operation as shown.

The output signal in this specific example is the voltage level at the collector of transistor 23 of each stage when conducting. Thus a stage is considered active when there exists therein a conducting transistor 23 and a quiescent transistor 22. In this situation a −2 volt signal level is available at diodes 51, representing a transistor 23 in the conducitng state, and permits transfer of a positive pulse through diode 53 in conjunction with a pulse $\varphi_1$ or $\varphi_2$ from pulse source 10 charging capacitor 52.

In accordance with the invention, circuitry is provided to assure that a particular stable state exists in one stage at a time; e.g., only one transistor 23 is conducting at any given time. This entails the provision of means to automatically correct for the absence of this condition in any stage by inserting the condition in a master stage, or should more than one stage display this condition at the same time, the provision of means to eliminate the condition automatically from all but the master stage.

This circuitry comprises automatic one minimum circuit 17 and automatic one maximum circuit 18 in conjunction with $\varphi_2$ pulses applied from pulse source 10 out of phase with the $\varphi_1$ advance pulses. Circuit 17 which serves to detect the state of all shift register stages comprises coincidence gating means, illustrated in this example as a plurality of diodes 61 each having its cathode connected to the output electrode of one transistor in a corresponding register stage. Like signals of a selected type will bias all of the diodes 61 so as to raise the voltage level at the anode of each of the diodes to the level of the more positve clamping voltage, in this instance −2 volts.

Like signals of an opposite type at each diode or a combination of the two signal types at the several diodes will permit conduction through one or more of the diodes 61 such that the voltage level at the anode of each diode 61 will be the more negative clamping voltage, in this instance −6 volts. The base of emitter follower transistor 62 is connected in common to the anode of each diode 61 and has its emitter output connected to diode 63 of a gating circuit also including diode 64. The $\varphi_2$ pulses are received in capacitor 65 connected between diodes 63 and 64, the latter diode being connected in turn to the base of one transistor in the master stage 11.

Circuit 18 comprises a similar coincidence gating circuit illustrated in Fig. 2 as a plurality of diodes 74 each having its cathode connected to the base of one transistor in a corresponding register stage other than the master stage 11. Transistor 71 has its base connected to the output electrode of one transistor in the master stage 11 and its emitter output connected to the anode of a diode 72 in each register stage. The phase $\varphi_2$ pulses are received in capacitors 73 each connected to a common point between corresponding diodes 72 and 74. In this instance a positive going signal, amplified in transistor 71, renders all diodes 72 conductive, thereby permitting the $\varphi_2$ pulses to charge capacitors 73 which, in turn, discharge as positive trigger signals through diodes 74 into the various stages other than the master stage 11 between application of $\varphi_1$ advance pulses.

Consider, first, the situation in which upon initially activating the register the active state is absent from all stages. In this situation advance pulses would fail to change the stable state in any stage, and output indications would not be forthcoming. The stable state of each register stage is detected in this particular example by a connection from the collector of transistor 22 in each stage to corresponding diodes 61 in the automatic one minimum circuit 17, a quiescent transistor 22 indicating an active stage.

The diodes 61 are biased such that, upon receipt of a −2 volt signal indicative of the conducting condition of the transistor 22 in each stage, they will all be cut off resulting in a change in the voltage level at the base of transistor 62. This change is amplified in transistor 62 and establishes a voltage level at the anode of diode 63, such that upon application of a phase $\varphi_2$ clock pulse to capacitor 65, a positive signal will be passed through diode 64 to the base of transistor 22 in the master shift register stage 11.

The effect of the positive pulse on the master stage 11 is such that transistor 23 is now conducting, thereby providing the desired output signal level of −2 volts from its collector to the associated output diode 51. Also, transistor 22 is now quiescent, and the related −6 volt level appears at diode 61 associated with the master stage 11. This in turn destroys the coincidence of signals presented to diodes 61 in automatic one minimum circuit 17 such that its output indication is now −6 volts, and subsequent $\varphi_2$ pulses applied to capacitor 65 will be ineffective to provide a trigger signal to the master stage 11 through diode 64.

The register is now prepared to circulate the desired active state through successive register stages. If during subsequent operation, however, the register reverts to the condition in which none of the stages are active at a given time, diodes 61 will react in conjunction with the phase $\varphi_2$ clock pulse to again place the master stage in the active state.

It is also possible that during the operation of the closed shift register, noise and deterioration of margins among other factors may result in the presence of more than one stage in the active state. This situation, of course, may destroy the desired operation and is overcome, in accordance with the invention, by the presence of the automatic maximum activity circuit 18. In this instance the conducting or quiescent condition of the transistors 22 and 23 of the master stage 11 is detected by a connection between the collector of transistor 23 and the base of transistor 71. Each time transistor 23 in the master stage 11 is triggered into conduction, indicative of the active state in the master stage, a positive going signal pulse is transmitted from the collector of transistor 23 to the base of amplifier transistor 71. The latter signal is amplified and transmitted to the anode of each of the diodes 72. With diodes 72 forward-biased by the positive signal from transistor 71, the capacitors 73, receiving $\varphi_2$ pulses from source 10, discharge through corresponding diodes 74 and into the base of each transistor 23 in stages other than the master stage. The resultant trigger pulses will serve to place the transistors 23 in a nonconducting condition if such condition did not already prevail, thereby assuring that the master stage is the only stage displaying the active stable state at this time.

It is to be understood that the above-described arrangement is illustrative of the application of the principles of the invention. Numerous other arrangements may be devised by those skilled in the art without departing from the spirit and scope of this invention. For example, the various indications of register stage condition may be taken from either side of the stage with either condition providing the indications so long as there is uniformity among all register stages.

What is claimed is:

1. A closed loop shift register comprising a plurality of bistable stages, means for detecting the stable state of each stage, means for applying advance pulses to each stage to trigger each stage into the stable state of the preceding stage in the loop, first means connected between said detecting means in each stage and a selected stage for applying a signal to change the stable state in said selected stage upon receipt of like indications from said detecting means in each stage, and second means connected between said selected stage and each of the other stages for applying a signal to trigger the other stages into the stable state opposite to that present in said selected stage.

2. A closed loop shift register comprising a plurality of bistable stages, means for detecting the stable state of each stage, means for applying advance pulses to each stage to trigger each stage into the stable state of the preceding stage in the loop, gating means connected to said detecting means in each stage, means connected to the output of said gating means for applying a trigger pulse to a selected stage in response to a signal from said gating means to reverse the stable state in said selected stage, other gating means connected to said selected stage, and means connected to the output of said other gating means for applying a trigger pulse to all stages other than said selected stage in response to a signal from said other gating means to trigger said other stages into the stable state opposite to that present in said selected stage.

3. A closed loop ring counter comprising a plurality of stages each having two stable states of operation, means interconnecting said stages for transferring the particular stable state of one stage to its succeeding stage, first monitoring means responsive to the absence from all stages of a first of said stable states to insert said first state in a first stage, and second monitoring means responsive to the presence of said first stable state in said first stage and other of said stages to shift said other stages to the other of said stable states.

4. A closed loop ring counter in accordance with claim 3 wherein said first monitoring means includes first gating means having input leads connected to each of said stages and said second monitoring means includes second gating means having output leads connected to each stage but said first stage and further comprising means for applying pulses to said stages in a first phase for the transfer of said stable states, and means for applying pulses to said first and second gating means in a second phase.

5. A closed loop shift register comprising a plurality of bistable stages, means for detecting the stable state of each stage, means for triggering each stage into the stable state of the preceding stage comprising means for applying first trigger pulses to each stage, first gating means connected to said detecting means in each stage, second gating means connected between said first gating means and a selected stage, means for enabling said first gating means to provide a signal to said second gating means upon detection of the same stable state in each stage, means including said signal from said first gating means for enabling said second gating means to provide a second trigger pulse to said selected stage, third gating means connected between said selected stage and each of the other stages, and means including a signal indicative of a particular stable state in said selected stage for enabling said third gating means to provide said second trigger pulses to said other stages.

6. A closed loop shift register in accordance with claim 5 and further comprising means for applying said first trigger pulses to said shift register out of phase with said second trigger pulses.

7. A closed loop shift register in accordance with claim 5 wherein said bistable stages each comprise a pair of transistors having base, emitter and collector electrodes, said first gating means being connected to the collector electrode of one of said transistors in each stage, said second gating means being connected to the base electrode of one of said transistors in said selected stage and said third gating means being connected between the collector electrode of one transistor in said selected stage and the base electrode of one transistor in each of the other stages.

8. A closed loop shift register in accordance with claim 7 wherein said first, second and third gating means comprise coincidence logic circuits including a plurality of unidirectional current devices.

9. A closed loop shift register comprising a plurality of bistable stages, means for indicating the stable state of each stage, means for triggering each stage into the stable state of the preceding stage comprising means for applying first trigger pulses to each stage, and means for establishing a particular stable state in a single stage, said last-mentioned means comprising a first coincidence gate connected to said indicating means in each stage, a second coincidence gate connected between the output of said first coincidence gate and said single stage, a third coincidence gate connected between said indicating means in said single stage and each of said other stages, and means for applying second trigger pulses to said second and third coincidence gates.

10. In combination, a closed shift register comprising a plurality of stages, each of said stages having first and second trigger devices cross-connected to define a bistable circuit, means for applying pulses in a first phase to each stage, means operative in conjunction with the application of said first phase pulses for placing each stage in the stable state of the preceding stage, and means for establishing a selected stable state in a single stage at one time, said last-mentioned means comprising first means connected between said first device in each stage and said first device in said single stage for changing the stable state in said single stage upon receipt in said first means of indications that all of said stages are in a second stable state, second means connected between said second device in said single stage and said second devices in the remaining stages for setting each of said remaining stages to said second stable state upon receipt in said second means of an indication that said single stage is in said first stable state, and means for applying pulses in a second phase to said first and second means for establishing the setting of said register stages by said first and second means between applications of said first phase pulses.

11. A closed loop shift register circuit comprising a pair of cross-connected transistors defining a bistable circuit in each stage and displaying the stable state of the preceding stage upon application of input pulses in a first phase to each stage, means for providing an output signal from each stage having a selected output transistor in a conducting condition, means for establishing said conducting condition in said output transistor of at least one of said stages comprising first means connected between one transistor of each stage and means connected to said first means for applying an input pulse in a second phase to one transistor in a selected stage in response to an output signal from said first means, and means for establishing said particular stable state in said output transistor of not more than one of said stages comprising second means connected to one transistor in said selected stage and means connected to said first means for applying an input pulse in said second phase to one transistor of each stage other than said selected stage in response to an output signal from said second means.

12. In combination, a closed loop shift register circuit comprising a plurality of interconnected bistable stages including a master stage, each of said stages comprising first and second transistors having base, emitter and collector electrodes and being cross-connected to define a bistable circuit, means for applying advance pulses in a first phase to the base electrodes of said transistors in each of said stages, means dependent upon the stable state of one stage in conjunction with application of said advance pulses for placing the succeeding stage in the stable state of said one stage, and means for assuring the presence of a particular stable state in a single one of said stages at one time, said last-mentioned means comprising a first plurality of diodes each having one side connected to the collector of a first one of said transistors in a corresponding one of each of said stages, means connected between the common output from the opposite side of said first diodes for applying signals in a second phase to the base of said first transistor in said master stage in response to a signal from said diodes, a second plurality of diodes each having one side connected to the base of the second transistor in each of said stages other than said master stage, means connected between the collector of said second transistor in said master stage and the opposite side of each of said second diodes, and means for applying said second phase signal to each of said stages other than said master stage in response to a signal from said master stage to said second diodes.

References Cited in the file of this patent

UNITED STATES PATENTS

| | | |
|---|---|---|
| 2,696,599 | Holbrook et al. | Dec. 7, 1954 |
| 2,715,678 | Barney | Aug. 16, 1955 |
| 2,719,959 | Hobbs | Oct. 4, 1955 |
| 2,724,104 | Wild | Nov. 15, 1955 |
| 2,744,955 | Canfora et al. | May 8, 1956 |
| 2,769,971 | Bashe | Nov. 6, 1956 |
| 2,840,708 | Sandiford | June 24, 1958 |